3,173,882
REMOVING METAL CONTAMINANTS FROM SILICA-BASED CRACKING CATALYSTS
Arvin D. Anderson, Santa Ana, Calif., assignor to Sinclair Research, Inc., Wilmington, Del., a corporation of Delaware
No Drawing. Filed Nov. 20, 1961, Ser. No. 153,722
6 Claims. (Cl. 252—413)

This invention is a method for the removal of poisoning metals from synthetic gel hydrocarbon conversion catalysts. The method is useful in conjunction with hydrocarbon conversion processes where the feed is contaminated with nickel, iron and/or vanadium and comprises treating the catalyst with molecular oxygen-containing gas at an elevated temperature, converting the metals to the sulfide form, and washing the catalyst with an acid solvent for the metal sulfide.

The method usually includes removing the catalyst containing metal contaminants from the hydrocarbon conversion system, treating with air, sulfiding the catalyst with a sulfiding vapor at an elevated temperature, removing poisoning metal contaminants from the catalyst, for instance, by the use of an aqueous solution of a mineral acid, and returning a catalyst of reduced poisoning metals content to hydrocarbon processing. This application is a continuation-in-part of my copending applications Serial No. 19,313, filed April 1, 1960, and 55,160, filed September 12, 1960, now abandoned.

Catalytically promoted methods for the chemical conversion of hydrocarbons include cracking, hydrocracking, reforming, hydroforming, etc. Such reactions generally are performed at elevated temperatures, for example, about 300 to 1200° F., more often 600 to 1000° F. Feedstocks to these processes comprise normally liquid and solid hydrocarbons which at the temperature of the conversion reaction are generally in the fluid, i.e. liquid or vapor, state and the products of the conversion frequently are lower-boiling materials.

In particular, cracking of heavier hydrocarbon feedstocks to produce hydrocarbons of preferred octane rating boiling in the gasoline range is widely practiced and uses a variety of solid oxide catalysts to give end products of fairly uniform composition. Cracking is ordinarily effected to produce gasoline as the most valuable product and is generally conducted at temperatures of about 750 to 1100° F., preferably about 850 to 950° F., at pressures up to about 200 p.s.i.g., preferably about atmospheric to 100 p.s.i.g., and without substantial addition of free hydrogen to the system. In cracking, the feedstock is usually a mineral oil or petroleum hydrocarbon fraction such as straight run or recycle gas oils or other normally liquid hydrocarbons boiling above the gasoline range.

Solid oxide catalysts have long been recognized as useful in catalytically promoting conversion of hydrocarbons. For cracking processes, the catalysts which have received the widest acceptance today are usually activated or calcined predominantly silica- or silica-based, e.g. silica-alumina, silica-magnesia, silica-zirconia, etc., compositions in a state of slight hydration and containing small amounts of acidic oxide promoters in many instances. The oxide catalyst may be alumina- or silica-based and ordinarily contains a substantial amount of a gel or gelatinous precipitate comprising a major portion of silica and at least one other material, such as alumina, zirconia, etc. These oxides may also contain small amounts of other inorganic materials, but current practice in catalytic cracking leans more toward the exclusion from the silica hydrate materials of foreign constituents such as alkaline metal salts which may cause sintering of the catalyst surface on regeneration and a drop in catalytic activity. For this reason, the use of wholly or partially synthetic gel catalysts, which are more uniform and less damaged by high temperatures in treatment and regeneration, is often preferable. Popular synthetic gel cracking catalysts generally contain about 10 to 30% alumina. Two such catalysts are "Aerocat" which contains about 13% $Al_2O_3$, and "High Alumina Nalcat" which contains about 25% $Al_2O_3$, with substantially the balance being silica. The catalyst may be only partially of synthetic material; for example it may be made by the precipitation of silica-alumina on clay, such as kaolinite or halloysite. One such semi-synthetic catalyst contains about equal amounts of silica-alumina gel and clay.

The manufacture of synthetic gel catalysts can be performed, for instance (1) by impregnating silica with alumina salts; (2) by direct combination of precipitated (or gelated) hydrated alumina and silica in appropriate proportions; or (3) by joint precipitation of alumina and silica from an aqueous solution of aluminum and silicon salts. Synthetic catalysts may be produced by a combination of hydrated silica with other hydrate bases as, for instance, magnesia, zirconia, etc. These synthetic gel-type catalysts are activated or calcined before use.

The physical form of the catalyst varies with the type of manipulative process to which it will be exposed. In a fixed-bed process, a series of catalytic reactors may be used, some being on stream and others in the process of cleaning, regeneration, etc. In circulating catalyst systems, such as those of the fluid catalytic and "TCC" processes, catalyst moves through a reaction zone and then through a regeneration zone. In the fluid process gases are used to convey the catalyst and to keep it in the form of a dense turbulent bed which has no definite upper interface between the dense (solid) phase and the suspended (gaseous) phase mixture of catalyst and gas. This type of processing requires the catalyst to be in the form of a fine powder, generally in a size range of about 20 to 150 microns. In the "TCC" or "Thermofor" process the catalyst is in the form of beads which are conveyed by elevators. Generally these beads may range in size up to about ½" in diameter. When fresh, the minimum sized bead is generally about ⅛". Other types of process use other forms of catalyst such as tablets or extruded pellets.

One of the most important phases of study in the improvement of catalyst performance in hydrocarbon conversion is in the area of metals poisoning. Although referred to as "metals," these catalyst contaminants may be in the form of free metals or relatively non-volatile metal compounds. It is to be understood that the term "metal" used herein refers to either form.

Various petroleum stocks have been known to contain at least traces of many metals. For example, Middle Eastern crudes contain relatively high amounts of several metal components, while Venezuelan crudes are noteworthy for their vanadium content and are relatively low in other contaminating metals such as nickel. In addition to metals naturally present, including some iron, petroleum stocks have a tendency to pick up tramp iron from transportation, storage and processing equipment. Most of these metals, when present in a stock, deposit in a relatively non-volatile form on the catalyst during the conversion processes so that regeneration of the catalyst to remove coke does not remove these contaminants.

Of the various metals which are to be found in representative hydrocarbon feedstocks some, like the alkali metals, only deactivate the catalyst without changing the product distribution; therefore, they might be considered true poisons. Others such as iron, nickel, vanadium and copper markedly alter the selectivity and activity of cracking reactions if allowed to accumulate. A poisoned catalyst generally produces a higher yield of coke and hydrogen at the expense of desired products, such as gasoline and butanes. Since many cracking units are limited by coke burning or gas handling facilities, increased coke or gas yields require a reduction in conversion or throughput to stay within the unit capacity. For instance, it has been shown that the yield of butane, butylenes and gasoline, based on converting 60 volume percent of cracking feed to lighter materials and coke dropped from 58.5 to 49.6 volume percent when the amount of nickel on the catalyst increased from 55 p.p.m. to 645 p.p.m. and the amount of vanadium increased from 145 p.p.m. to 1480 p.p.m. in fluid catalytic cracking of a feedstock containing some metal contaminated stocks. Also, it has been shown that the yield of gasoline, based on feed disappearance, dropped from 93 to 82% in commercial cracking of a feed containing some highly contaminated marginal stocks when the laboratory-measured coke factor of a catalyst rose from 1.0 to 3.0. This decreased gasoline yield was matched by an increase in gas as well as coke. If a poison is broadly defined as anything that deactivates or alters the reactions promoted by a catalyst then all of these four metals can be considered poisons. It is hypothesized that these metals when deposited on the surface of the cracking catalysts superimpose their dehydrogenation activity on the cracking reactions and convert into carbonaceous residue and gas some of the material that would ordinarily go into gasoline. The relatively high content of hydrogen in the gases formed by metals-contaminated catalysts is evidence that dehydrogenation is being favored. This unwanted activity is especially great when nickel and vanadium are present in the feedstocks.

An alternative to letting catalyst metals level increase and activity decrease is to diminish the overall metal content by raising catalyst replacement rates. Either approach, letting metals level increase or increasing catalyst replacement rates, must be balanced against product value and operating costs to determine the most economic way of operating. The optimum metal level at which to operate any cracking unit will be a function of many factors including feedstock metal content, type and cost of catalyst, overall refinery balance, etc., and can be determined by a comprehensive study of the refinery's operations. A further alternative, demetallizing the catalyst, which avoids discarding of expensive catalyst and enables much lower grade, highly metals contaminated feedstocks to be used, is now possible in this invention.

Commercially used cracking catalysts are the result of years of study and research into the nature of cracking catalysis, and the cost of these catalysts is not negligible. The cost frequently makes highly poisoned feedstocks less desirable to use in cracking operations, even though they may be in plentiful supply, because of their tendency to damage the expensive catalysts. The expense of such catalysts, however, is justified because the composition, structure, porosity and other characteristics of such catalysts are rigidly controlled so that they may give optimum results in cracking. It is important, therefore that removing poisoning metals from the catalyst does not jeopardize the desired chemical and physical constitution of the catalyst. Although methods have been suggested in the past for removing poisoning metals from a catalyst which has been used for high temperature hydrocarbon conversions, for example, the processes of U.S. Patents 2,481,253; 2,488,718; 2,488,744; 2,668,798 and 2,693,455, the process of this invention is effective to remove metals without endangering the expensive catalyst.

In this invention, the hydrocarbon petroleum oils utilized as feedstock for a conversion process may be of any desired type normally utilized in catalytic conversion operations, and may contain much higher amounts of poisoning metals than formerly were considered tolerable. The feedstock sometimes has as much as 30 to 300 or more p.p.m. metal poisons and the catalyst may be used as a fixed, moving or fluidized bed or may be in a more dispersed state. For typical operations, the catalytic cracking of the hydrocarbon feed would normally result in a conversion of about 50–60% of the feedstock into a product boiling in the gasoline boiling range. The catalytic conversion system also usually includes a regeneration procedure in which the catalyst is contacted periodically with free oxygen-containing gas in order to restore or maintain the activity of the catalyst by removing carbon. It will be understood that in this specification and claims "regeneration" refers to this carbon burn-off procedure. This invention is practiced on a catalyst after its removal from the hydrocarbon conversion system.

In this invention the essentially carbon-free catalyst is contacted with an oxygen-containing gas for a time sufficient to convert a significant amount of the vanadium on the catalyst to the higher valence state. Ordinarily, the catalysts are treated before the poisoning metals have reached an undesirably high level, for instance, about 0.5%, generally no more than about 0.2% maximum, content of vanadium. Prior to oxygen treatment, subjecting the poisoned catalyst sample to magnetic flux may be found desirable to remove any tramp iron particles which may have become mixed with the catalyst.

Regeneration of a catalyst to remove carbon is a relatively quick procedure in most commercial catalytic conversion operations. For example, in a typical fluidized cracking unit, a portion of catalyst is continually being removed from the reactor and sent to the regenerator for contact with air at about 950 to 1200° F., more usually about 1000 to 1150° F. Combustion of coke from the catalyst is rapid, and for reasons of economy only enough air is used to supply the needed oxygen. Average residence time for a portion of catalyst in the regenerator may be on the order of about six minutes and the oxygen content of the effluent gases from the regenerator is desirably less than about ½%. The regeneration of any particular quantum of catalyst is generally regulated to give a carbon content of less than about 5.0%, generally less than about 0.5%.

Treatment of the regenerated catalyst with molecular oxygen-containing gas is preferably at a temperature at least about 50° F. higher than the regeneration temperature, that is, the average temperature at which the major portion of carbon is removed from the catalyst. The temperature of treatment with molecular oxygen-containing gas will generally be in the range of about 1000 to 1800° F. but below a temperature where the catalyst undergoes any substantial deleterious change in its physical or chemical characterstics. The catalyst is in a substantially carbon-free condition during this high-temperature treatment. If any significant amount of carbon is present in the catalyst at the start of this high-temperature treatment, the essential oxygen contact is that continued after carbon removal. In any event, after carbon removal the oxygen treatment of the essentially carbon-free catalyst is at least long enough to convert a substantial amount of vanadium to a higher valence state, as evidenced by a significant increase, say at least about 10%, preferably at least about 100%, in the vanadium removal in subsequent stages of the process. This increase is over and above that which would have been obtained by the other metals removal steps without the oxygen treatment.

The treatment of the poisoned catalyst with molecular oxygen-containing gas is preferably performed at a temperature of about 1200 to 1400 or even as high as 1600° F. Little or no effect on vanadium removal is accomplished by treatment at temperatures significantly below about 1000° F., even for an extended time. The upper temperature, to avoid undue catalyst damage, will usually not materially exceed about 1600 or 1800° F. The duration of the oxygen treatment and the amount of vanadium prepared by the treatment for subsequent removal is dependent upon the temperature and the characteristics of the equipment used. The length of the oxygen treatment may vary from the short time necessary to produce an observable effect in the latter treatment say, a quarter of an hour, to a time just long enough not to damage the catalyst. In a relatively static apparatus such as a muffle furnace, the effectiveness of the treatment can increase with the time over a rather extended period; in other types of apparatus, however, such as a flow reactor, where there is more thorough contact of catalyst and gas, little increase in effectiveness has been observed after about four hours of treatment.

The oxygen-containing gas used in the treatment contains molecular oxygen as the essential active ingredient and there is little significant consumption of oxygen in the treatment. The gas may be oxygen, or a mixture of oxygen with inert gas, such as air or oxygen-enriched air. The partial pressure of oxygen in the treating gas may range widely, for example, from about 0.1 to 30 atmospherses, but usually the total gas pressure will not exceed about 25 atmospheres. The factors of time, partial pressure and extent of vanadium conversion may be chosen with a view to the most economically feasible set of conditions. It is preferred to continue the oxygen treatment for about 1 to 4 hours with a gas containing at least about 1%, preferably at least about 10%, oxygen. The treatment is not prolonged to a point where the catalyst would be damaged. The maximum practical time of treatment will vary up to 24 hours, depending on the type of equipment used.

The catalyst is next contacted with a sulfiding agent at elevated temperatures apparently to obtain surface concentration of metal sulfides by converting at least a substantial amount of one or more of the poisoning metals to sulfide form and subsequently removing the metal sulfide by means of an appropriate acid solvent. The process may be repeated for further reductions in metals, to give the catalyst an activity profile more comparable to that of the virgin unpoisoned catalyst.

It is theorized that metals present in poisoned cracking catalysts are largely in solid solution in the catalyst matrix. The metal ions being mobile in solution at elevated temperatures, it has been found possible to concentrate the metals at the catalyst surface by treatment with hydrogen sulfide at elevated temperatures. The hydrogen sulfide converts the metal ions at the surface to metal sulfides which are insoluble in the matrix. Diffusion of metal ions transports additional metal to the surface where it is in turn converted to the sulfide. Thus a continuing process concentrates the metals as sulfides on the catalyst surface from where they are more readily removed. Prior to reusing the catalyst it can be calcined, say at temperatures usually in the range of about 700 to 1300° F., conveniently by addition to the cracking unit catalyst regenerator.

In the demetallization procedure of this invention sulfiding can be performed by contacting the poisoned catalyst with elemental sulfur vapors, or more conveniently by contacting the poisoned catalyst with a volatile sulfide, such as $H_2S$, $CS_2$ or a mercaptan. The contact with the sulfur-containing vapor can be performed at an elevated temperature generally in the range of about 700 to 1600° F., preferably about 1000 to 1200° F. Other treating conditions can include a sulfur-containing vapor partial pressure of about 0.1 to 30 atmospheres or more, preferably about 0.5 to 25 atmospheres. Hydrogen sulfide is the preferred sulfiding agent and the gas contains 10 to 100% $H_2S$, preferably 80 to 100% $H_2S$. Pressures below atmospheric can be obtained either by using a partial vacuum or by diluting the vapor with gas such as hydrogen or nitrogen; higher pressures of $H_2S$ do not seem to give any advantage. The time of contact is that required to convert a significant amount of poisoning metal to sulfide and may vary on the basis of the temperature and pressure chosen and other factors such as the amount of metal to be removed. It usually lasts about 1 to 6 hours but the sulfiding may run for, say, up to about 24 hours or more depending on these conditions and the severity of the poisoning. Temperatures of about 900 to 1200° F. and pressures approximating 1 atmosphere or less seem near optimum for sulfiding and this treatment often continues for at least 1 or 2 hours but the time, of course, can depend upon the manner of contacting the catalyst and sulfiding agent and the nature of the treating system, e.g. batch or continuous, as well as the rate of diffusion within the catalyst matrix. After this step the catalyst may be purged and cooled by contact with nitrogen, etc., gas at a lower temperature.

The solvent for the metal sulfide is an aqueous solution of a mineral acid. Acids containing an anion which forms soluble salts with nickel and/or vanadium and/or iron are suitable for use in water solution to dissolve the Ni and/or V and/or Fe sulfides from the surface of the catalyst and generally sulfuric, hydrochloric or nitric acid is used in the form of the free acid or the ammonium salt. The liquid aqueous solution is employed at 32 to 212° F., preferably about 70 to 150° F. Temperatures toward the upper limit of this range are advantageous in increasing solubility. Temperatures above 215° F. require pressurized equipment, the cost of which does not appear to be justified. The temperature, of course, should not be so high and the contact should not be so long as to seriously harm the catalyst. The time of contact also may vary within wide limits, so long as thorough contact between the catalyst and wash solution is assured. Very short contact times, for example, about a minute, are satisfactory, while the time of washing may last up to about 120 minutes or longer. A contact time of 15 minutes to 1 hour is satisfactory and is preferred.

Generally the slurry of catalyst in aqueous acid solution will contain about 0.5 to 50% acid, preferably about 2 to 10% acid, and will contain about 1 to 30% catalyst by weight, preferably 10 to 20%. Usually the pH is less than about 2.

After the acid treatment the catalyst can be washed with an aqueous medium to remove remaining soluble or dispersible components, preferably at least until there is substantially no trace of nickel, vanadium or iron in the wash effluent. Ambient temperatures can be used but temperatures of about 150° F. to the boiling point of water are helpful in increasing solubility. Pressures above atmospheric may be used but the results usually do not justify the additional equipment.

After the solvent treatment or after the final aqueous wash which may be used in the catalyst demetallization procedure, the catalyst is conducted to a hydrocarbon conversion system, for instance to the conversion reactor or catalyst regenerator, although it may be desirable first to dry a wet catalyst filter cake or filter cake slurry at say about 250 to 450° F. and also, prior to reusing the catalyst in the conversion operation it can be calcined, say at temperatures usually in the range of about 700 to 1300° F., conveniently by addition to the cracking unit catalyst regenerator. Prolonged calcination of the catalyst at above about 1100° F. may sometimes be disadvantageous. Calcination removes free water, if any is present and perhaps some but not all of the combined water and leaves the catalyst in an active state without undue sintering of its surface. Inert gases frequently may be employed after contact with reactive vapors to remove any of these vapors entrained in the catalyst or to purge the catalyst of reaction products.

The demetallization procedure of this invention has been found to be highly successful when used in conjunction with fluidized catalyst hydrocarbon conversion systems to control the amount of metal poisons on the catalyst. When such catalysts are processed, a fluidized solids technique is recommended for these vapor contact demetallization procedures as a way to shorten the time requirements. Any given step in the demetallization treatment is usually continued for a time sufficient to effect a substantial conversion or removal of poisoning metal and ultimately results in a substantial increase in metals removal compared with that which would have been removed if the particular step had not been performed. After the available catalytically active poisoning metal has been removed, in any removal procedure, further reaction time has relatively little effect on the catalytic activity of the depoisoned catalyst, although further metals content may be removed by repeated or other treatments.

The actual time or extent of treating depends on various factors and is controlled by the operator according to the situation he faces, e.g. the extent of metals content in the feed, the level of conversion unit tolerance for poison, the sensitivity of the particular catalyst toward a particular phase of the demetallization procedure, etc. Also, the thoroughness of treatment of any quantum of catalyst in commercial practice is balanced against the demetallization rate chosen, that is, the amount of catalyst, as compared to the total catalyst in the conversion system proper, which is subjected to the demetallization treatment per unit of time. A high rate of catalyst withdrawal from the conversion system and quick passage through a mild demetallization procedure suffices as readily as a more intensive demetallization at a slower rate to keep the total of poisoning metal in the conversion reactor within the tolerance of the unit for poison.

The catalyst to be treated may be removed from the hydrocarbon conversion system—that is, the stream of catalyst which in most conventional procedures is cycled between conversion and regenerating operations—before the poison content reaches about 5000 to 10,000 p.p.m., the poisoning metals being calculated as their common oxides. Generally, at least about 250 or 500 p.p.m., poisoning metal will be accumulated on the catalyst before demetallization is warranted. A suitable amount, generally a very small portion of the catalyst is removed from the hydrocarbon conversion system and given the oxygen treatment after the oxidation regeneration which serves to remove carbonaceous deposits. With a continuously circulating catalyst stream, such as in the ordinary "fluid" system this may conveniently be done by the intermittent or continuous removal of a slip-stream of catalyst from the regenerator standpipe. The severity of regeneration is generally such that the catalyst sent to demetallization contains not more than about 0.5% carbon. Where the catalyst is sent to the high temperature treatment with molecular oxygen-containing gas before it is substantially carbon free, the length of oxygen treatment, as recited above, is reckoned from the time that the catalyst reaches the substantially carbon-free state, that is the state where little, if any, carbon is burned or oxygen consumed even when the catalyst is contacted with oxygen at temperatures conducive to combustion.

The amount of Ni, V or Fe removed in practicing the procedures outlined or the proportions of each which are removed may be varied by proper choice of treating conditions. It may prove necessary, in the case of very severely poisoned catalysts, to repeat one or more treatments to reduce the metals to an acceptable level, perhaps with variations where one metal is greatly in excess. A further significant advantage of the process lies in the fact that the overall metals removal operation, even if repeated, does not unduly deleteriously affect the activity, selectivity, pore structure and other desirable characteristics of the catalyst.

In practice the process could be applied in a refinery by removing a portion of catalyst from the regenerator or regenerator standpipe of the cracking system after a standard regeneration treatment to remove a good part of the carbon, and heating this portion of the catalyst inventory preferably at least about 50° F. higher than the average regeneration temperature, in air for the length of time found to be sufficient for vanadium removal without catalyst damage. Then the catalyst is maintained in a hydrogen sulfide or a hydrogen sulfide-inert gas mixture for 1 to 3 hours at temperatures approximating 1050° F. The sulfiding gas may be purged from the catalyst by an inert gas, perhaps at a cooler temperature, and treated with the aqueous solvent solution. The treated catalyst can be returned to the unit, for example, to the regenerator, reducing greatly the new catalyst requirement. The apparatus used to perform the process of the invention may be suitable for conducting part or all of the procedures with fluidized beds of finely divided catalyst in the various operations.

The following examples are illustrative of the invention but should not be considered limiting.

A batch of regenerated catalyst was obtained which had been poisoned with metal contaminants from use in a commercial catalytic cracking unit using conventional fluidized catalyst techniques, including cracking and air regeneration at about 1100° F., to convert a feedstock (A) comprising a blend of Wyoming and Mid-Continent gas oils containing about 1.2 p.p.m. vanadium, about 0.3 p.p.m. nickel, about 1.0 p.p.m. iron and about 2 weight percent sulfur. This gas oil blend had a gravity (API) of 24°, a carbon residue of about 0.3 weight percent and a boiling range of about 500 to 1000° F. The base catalyst (25) was a synthetic gel type cracking catalyst containing about 22% $Al_2O_3$, the balance silica. The sample had a poisoning metals content of 2880 p.p.m. Fe, 328 p.p.m. NiO and 4320 p.p.m. $V_2O_5$. The catalyst is heated for about four hours at 1300° F. in a bed fluidized with air after which the catalyst is stripped with nitrogen. The stripped catalyst is then heated in a bed fluidized with hydrogen sulfide for about 1½ hours at 1150° F. The sulfided catalyst is cooled to 600° F. in inert gas and divided into two portions which were treated with HCl and $H_2SO_4$ solutions. The results are listed in the following table.

*Table 1*

| Test | Base 25 | 42B | 42C |
|---|---|---|---|
| Acid Used | 0 | HCl | $H_2SO_4$ |
| Wt. Percent Catalyst in Slurry | | 25 | 25 |
| Wt. Percent Acid in Slurry | | 26 | 30 |
| Contact Time | | 10 | 10 |
| Temperature, °F | | 75 | 120 |
| Results: | | | |
| P.p.m. NiO | 328 | 205 | 209 |
| P.p.m. $V_2O_5$ | 4,320 | 3,855 | 3,591 |
| Percent Fe | 0.288 | 0.242 | 0.232 |

After the treatment, catalyst samples 42B and 42C are sent to a hydrocarbon conversion cracking system where resuts are obtained greatly improved over the performance of untreated base sample 25.

Although the art has stated that acid treatment of a catalyst after use in cracking a sulfur-containing metals contaminated hydrocarbon feedstock is effective in removing metals, the following examples show such treatment to be far less effective than when sulfiding is conducted outside the conversion system.

A portion of base catalyst 12 which was similar in composition to base 25 and had been poisoned to different levels in the conversion of feedstock A was divided into samples 14 and 15 which each were washed with an aqueous solution containing 10% HCl, sample 14 being in contact with the solution for 2 minutes and sample 15 for 1 hour. Base catalyst 10 is a synthetic gel silica-alumina fluid type cracking catalyst poisoned to 726 p.p.m. NiO and 2510 p.p.m. $V_2O_5$ and 0.364% Fe by use in a pilot plant operation cracking a petroleum gas oil hydrocarbon stock containing tramp iron as well as nickel, vanadium and iron naturally present in the feedstock. A sample (21) of this base catalyst was treated with $H_2S$ for 16 hours, at 730° F. and 310 p.s.i.g. $H_2S$, in a Pyrex-lined rocker bomb. The 15 g. sample was then slurried in 75 ml. of 0.7 molar $HNO_3$ for 1 hour at room temperature and washed until free of nitrate ion. The filtrate contained only a trace of Al, so no analysis was made for alumina loss. Table II shows the results of these treatments.

*Table II*

| Sample | 12 | 14 | 15 | 10 | 21 |
|---|---|---|---|---|---|
| Analysis (p.p.m.): | | | | | |
| NiO | 306 | 307 | 303 | 726 | 582 |
| $V_2O_5$ | 3,759 | 3,402 | 2,814 | 2,510 | 1,248 |
| Percent Fe | 0.269 | 0.252 | 0.215 | 0.364 | 0.370 |
| Percent $Al_2O_3$ | 26.1 | 26.0 | 21.4 | | |
| Metal removal (Percent): | | | | | |
| Ni | | | | | 19.8 |
| V | | 9.7 | 25.1 | | 50.0 |
| Fe | | 6.5 | 20.2 | | 0 |
| Al | | 0.04 | 18.0 | | |

These results show the improved poisoning metal removal brought about by the process of this invention.

It is claimed:

1. A method for removing metal contaminants from a synthetic gel, silica-based cracking catalyst which has been poisoned by contamination with a metal selected from the group consisting of nickel and vandium due to use of said catalyst in a cracking system wherein gasoline is produced and catalyst is cycled between a cracking zone, in which the catalyst is contacted at an elevated temperature with a hydrocarbon feedstock boiling above gasoline and containing said metal which deposits on the catalyst, and a regeneration zone, in which carbon is oxidized and thereby removed from the catalyst, which consists essentially of bleeding a portion of meal contaminated catalyst from the cracking system, contacting bled, substantially carbon-free catalyst for at least about 15 minutes with a gas containing molecular oxygen at a temperature of at least about 1000° F. but below a temperature deleterious to the catalyst to increase subsequent metal removal from said catalyst, sulfiding the metal contaminated, oxygen-treated catalyst by contact with a sulfiding vapor at a temperature of about 700 to 1600° F., removing contaminating metal sulfide from the catalyst by contact with an aqueous mineral acid solvent for the contaminating metal sulfide and returning resulting demetallized catalyst to a hydrocarbon cracking system.

2. The method of claim 1 in which the contact with gas containing molecular oxygen is at about 1150 to 1600° F.

3. The method of claim 1 where the sulfiding is performed by contact with hydrogen sulfide at an elevated temperature.

4. The method of claim 3 where the hydrogen sulfide is at a temperature of about 900 to 1200° F. and a $H_2S$ pressure of about 0.5 to 25 atmospheres.

5. The method of claim 1 in which the acid is selected from the group consisting of sulfuric, nitric and hydrochloric acids.

6. A method for removing metal from a synthetic gel, silica-alumina hydrocarbon cracking catalyst which has been poisoned by contamination with a metal selected from the group consisting of nickel and vanadium due to use of said catalyst in a cracking system wherein catalyst is cycled between a cracking zone, in which catalyst is contacted at an elevated temperature with a hydrocarbon feedstock containing said metal contaminant which deposits on the catalyst, which feedstock is converted to lower-boiling materials, and a regeneration zone, in which carbon is oxidized and thereby removed from the catalyst, which comprises bleeding from the cracking system a portion of metal contaminated catalyst containing less than about 10,000 p.p.m. poisoning metals, measured as the common oxides, contacting the bled, substantially carbon-free catalyst, for at least about 15 minutes with a gas containing molecular oxygen at a temperature of at least about 1000° F. but below a temperature deleterious to the catalyst to increase subsequent metal removal from said catalyst, sulfiding poisoning metal containing component on the oxygen-treated catalyst by contact with $H_2S$ vapor at a temperature of about 700 to 1600° F., removing sulfide from the catalyst by contact with an aqueous solvent for the sulfide containing a mineral acid selected from the group consisting of sulfuric, nitric and hydrochloric acids and returning resulting demetallized catalyst to a hydrocarbon cracking system.

References Cited in the file of this patent

UNITED STATES PATENTS

| 2,491,694 | Stiles | Dec. 20, 1949 |
| 2,754,273 | Shabaker | July 10, 1956 |

FOREIGN PATENTS

| 1,040,723 | Germany | Oct. 9, 1958 |
| 596,177 | Canada | Apr. 12, 1960 |